C. ELLIS.
CONCENTRATION OF WASTE SULFITE LIQUOR.
APPLICATION FILED NOV. 30, 1910.
1,042,538.
Patented Oct. 29, 1912.
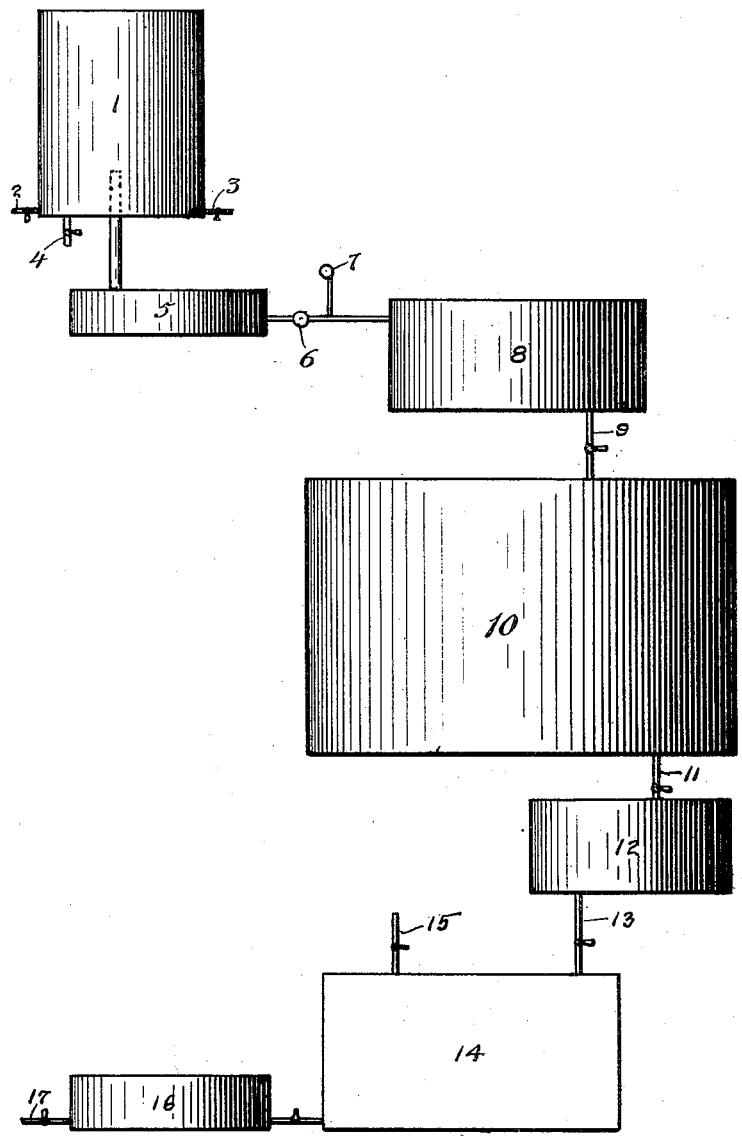
WITNESSES:
B. M. Ellis.
Nathaniel L. Foster
INVENTOR.
Carleton Ellis.

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

CONCENTRATION OF WASTE SULFITE LIQUOR.

1,042,538. Specification of Letters Patent. Patented Oct. 29, 1912.

Application filed November 30, 1910. Serial No. 594,881.

*To all whom it may concern:*

Be it known that I, CARLETON ELLIS, a citizen of the United States, and resident of Montclair, in the county of Essex and State of New Jersey, have invented certain new and useful Improvements in Concentration of Waste Sulfite Liquor, of which the following is a specification.

This invention relates to the treatment of waste sulfite liquors from paper mills more particularly with reference to the production of a concentrated liquor suitable as a binding material in the treatment of road surfaces.

Ordinary waste sulfite liquor is entirely unsatisfactory for the treatment of roads but in the concentrated form, it has considerable binding qualities and were it not for its marked solubility in water, it would be extensively used for this purpose. Of course, it is possible to waterproof the material more or less by the use of oils especially oils containing asphaltic bases, but this involves some expense and trouble in preparation and in many cases, a considerable proportion of the oil has to be present in order to secure satisfactory resistance to moisture and rain.

The present invention has for its object the production of a binding material from the concentrated liquor which is relatively unaffected by moisture so that it may be used without oil or with a minimum amount of the latter. Ordinary concentrated sulfite liquor is more or less hygroscopic and this tendency to absorbing moisture is due in part to the presence of certain saccharine matters which are present in the liquor, oftentimes in an amount of several per cent. or so. The present invention concerns the treatment of the liquor so as to remove these undesirable sugary matters and render the liquor better suited for use as a road binding material. After the liquors are received from the paper mill, there are more or less acid due to the presence of sulfurous acid and it is necessary to neutralize the acidity, which may be done either with the addition of lime or other alkali or the waste alkali liquors from the manufacture of soda pulp may be used for such neutralization. At this point, there is oftentimes a separation of the sludge which contains a good deal of lime, and the sludge may be removed and treated with sulfurous acid and again used in the manufacture of sulfite powder.

In order to remove to a large extent the sugary matters from the liquor, I subject it to fermentation. This is conveniently done in the neutralized liquor which may be concentrated more or less if desired prior to the fermentation treatment. In order to conduct the fermentation properly, the neutralized liquors should be cooled and aerated. Yeast or malt extract or other fermenting material is then added and the liquor allowed to stand under suitable fermenting conditions for several days until the sugary matter has been very largely destroyed. The liquor may then be filtered in case further separation of insoluble matter has occurred and then placed in an evaporating pan such as a multiple effect evaporator. The first runnings from the evaporator contain water and alcohol and the latter may be recovered by distillation or rectification in any suitable or standard manner. The liquor in the evaporator is concentrated, preferably until its specific gravity is about 30° Bé. when it may be again put through a filter or filter press and is ready for use as a road binding material.

The finished product may be used directly on roads either in its concentrated form or diluted with one or two volumes of water more or less, and if desired, a small quantity of petroleum residuum, asphalt oil and the like may be incorporated therewith.

In the accompanying drawings, a neutralizing tank, filtering arrangement, together with filtering tanks and a multiple evaporator is shown in elevation.

In the drawings 1 is a neutralizing tank, having the inlet 2 for steam and steam exhaust pipe 3. A sludge outlet is provided at 4.

5 is a filter press and 6 a rotary pump intended to elevate the liquors to the fermentation tanks 10.

7 is an air blower adapted to force air into the liquor and thus aerate it.

8 is a cooling device.

The pipe 9 acts as a distributer conveying the liquids to the various fermenting tanks 10. From these tanks the liquid is drawn by the pipe 11 through a rapid filter 12 and by means of pipe 13 to the evaporator 14. It discharges from the evaporator into the filter press 16 and the finished liquor is withdrawn by the pipe 17. An outlet on the evaporator is provided at 15 for the removal of water, alcohol, etc.

The operation of the apparatus is as follows:—The raw sulfite liquor is placed in the tank 1 and lime or other neutralizing agent is added to render the liquor substantially neutral. It may be even over-neutralized without disadvantage. The liquor may be heated by means of steam equipment indicated by 2 and 3 which furnish steam to a jacket on the bottom of the tank. After settling, the liquor is drawn through the filter press 5, is aerated by the pump 7 and cooled by the cooling means 8. It is then run into the tanks 10 and yeast or other fermenting material added and the liquor is allowed to stand until the fermentable sugars have become very largely destroyed. The liquor is then run through the rapid filter 12 into the evaporator 14 where it is concentrated preferably to a gravity of about 30° Bé. Of course, the first runnings containing alcohol and other products of fermentation, etc., may be conveyed to a still of any ordinary or standard type and redistilled. The concentrated liquor which at this point if not entirely free from precipitated matter may be run through the filter press 16 in order to filter the liquor and produce a clear product. The concentrated liquor may also be used in the cloudy condition or even with a considerable percentage of precipitated matter providing such precipitate is not so dense as to settle and form a hard cake in the container. The presence of a moderate amount of flocculent precipitated matter is for some purposes desirable and in the manufacture of the composition in this condition filtering may be omitted except such filtration as may be required to remove the denser or heavier portions of separated bodies.

Having described my invention to the details of which I do not wish to limit myself, what I claim is:—

1. The process of making concentrated sulfite liquor adapted for use as a binding material in the treatment of road surfaces, comprising approximately neutralizing waste sulfite liquor containing the diffusible constituents thereof, fermenting said liquor, and concentrating it to a heavy bodied syrupy condition.

2. The process of making concentrated sulfite liquor adapted for use as a binding material in the treatment of road surfaces, comprising approximately neutralizing crude waste sulfite liquor containing the diffusible constituents thereof, aerating the said liquor, fermenting the same to remove a substantial proportion of the sugary constituents thereof, and concentrating the treated liquor to a specific gravity of approximately 30° Bé.

3. The process of making concentrated sulfite liquor, adapted for use as a binding material in the treatment of road surfaces, comprising approximately neutralizing waste sulfite liquor containing the diffusible constituents thereof, removing the sludge of neutralization, fermentating said liquor, separating volatile bodies therefrom and concentrating the residue to a heavy bodied syrupy liquid.

4. The process of making concentrated sulfite liquor of reduced saccharine content, for use as a binding material in the treatment of road surfaces, comprising approximately neutralizing dilute waste sulfite liquor containing the diffusible constituents thereof, freeing the treated liquor from solid matter, treating the liquor with yeast under conditions suitable for fermenting, allowing the liquor to ferment whereby the saccharine matter contained therein is converted into alcohol, separating volatile bodies from the liquor, and concentrating the residue to a heavy bodied syrupy liquid.

5. The process of making concentrated sulfite liquor, adapted for use as a binding material in the treatment of road surfaces, comprising approximately neutralizing waste sulfite liquor containing the diffusible constituents thereof, fermenting said liquor under suitable fermenting condition, and concentrating the treated liquor to a heavy-bodied syrupy liquid under reduced atmospheric pressure.

6. As a new article of manufacture, concentrated waste sulfite liquor adapted for use as a binding material in the treatment of road surfaces, said liquor being a heavy-bodied syrupy liquid substantially free from sugary material.

7. As an article of manufacture, concentrated waste sulfite liquor adapted for use as a binding material in the treatment of road surfaces, said liquor having a specific gravity of approximately 30° Bé., and being substantially free from sugary material.

8. As an article of manufacture, clear syrupy concentrated waste sulfite liquor adapted for use as a binding material in the treatment of road surfaces, said liquor being a heavy-bodied syrupy liquid substantially free from fermented non-resinous material.

Signed at Montclair, in the county of Essex and State of New Jersey, this 28th day of November, A. D. 1910.

CARLETON ELLIS.

Witnesses:
BIRDELLA M. ELLIS,
NATHANIEL L. FOSTER.